Patented Nov. 9, 1948

2,453,471

UNITED STATES PATENT OFFICE 2,453,471

PRESERVING CAUSTIC SODA FROM CONTAMINATION IN METAL CONTAINERS

John Lyman Switzer and John C. Michalek, Niagara Falls, N. Y., assignors to Mathieson Chemical Corporation, a corporation of Virginia No Drawing. Application May 2, 1940, Serial No. 332,966

4 Claims. (Cl. 117—75)

This invention is concerned with preserving caustic soda from contamination by corrosion products from metal surfaces of containers in which the caustic soda is shipped or stored and, conversely, aims to protect the metal of such containers from corrosion.

It has been proposed heretofore to cover the surfaces of metal tanks and vessels in which caustic soda solutions are stored with a protective coating so that the caustic soda solutions will not come in contact with the metal and thereby be contaminated. A number of such coatings have been proposed, but so far as we are aware none of these coatings is durable under severe conditions of use such as encountered in storage or shipment of very strong caustic soda solutions at high temperatures, say in excess of 140° F. Thus, in so far as we are aware none of the coating materials proposed heretofore will withstand the action of 70–75% NaOH solutions at temperatures of the order of 210° F. Temperatures of 210° F. or higher are encountered when strong caustic solutions are stored or shipped in liquid condition and also when tanks are washed out with hot water.

As a result of our investigations, we have discovered a method whereby caustic soda stored in metallic containers is preserved from contamination and the metal containers themselves protected from corrosion at temperatures far in excess of the maximum allowable for previously known coating compositions (say, 140° F.), which involves coating the metal surfaces of the containers with a mixture containing a relatively high proportion of polystyrene and a relatively small proportion of a finely-divided solid that is substantially inert to caustic soda. Preferably, the finely-divided solid is a pigment, and several pigments that are substantially inert with respect to caustic soda may be employed, among them, titanium dioxide and carbon black.

When a polystyrene coating composition used in accordance with our invention is employed to protect steel surfaces or the like, we recommend that the surface first be covered with a suitable primer which has good adherence both for the polystyrene coating composition and the steel. A number of suitable primers are disclosed hereinafter.

Preferably, the polystyrene employed in the formation of a film or coating in accordance with our invention has a high molecular weight. At elevated temperatures, say, in excess of 200° F., we find that best results are obtained with polystyrenes having a molecular weight of 100,000 or higher. For use in connection with caustic solutions at very high temperatures, say 220 to 250° F., we prefer to employ polystyrene having a molecular weight of the order of 200,000. For low temperatures, i. e., temperatures below about 160° F. polystyrenes having a molecular weight of about 50,000 are desirable. Where applicable, polystyrenes having a molecular weight of the order of 50,000 afford advantages, in that with them it is possible to compound coating compositions with a higher proportion of solids without unduly increasing the viscosity of the compositions.

We have found that a pure polystyrene film is not suitable for preventing action between caustic soda and metal. Such films do not adhere satisfactorily to metal, particularly steel. We have discovered, however, that by including in the polystyrene a thoroughly dispersed finely-divided solid of suitable type, the adherence and durability of the resulting film is increased and at the same time the tendency of the polystyrene to flow at high temperatures is so inhibited that the film remains intact under the conditions existing in the storage and transport of strong caustic. In short, some improvement in the adherence, softening temperature and durability of polystyrene films can be obtained by including in the film a substantial proportion of finely-divided solid that is inert to caustic soda. However, certain pigments, particularly carbon black, are especially useful and impart to polystyrene films remarkable durability and resistance.

As indicated hereinbefore, it will be desirable and in most cases essential to apply to the metal surface to be protected a suitable priming coat so as to secure the polystyrene film strongly to the metal. A number of suitable primers are available. Thus, a suitable primer may comprise in parts by weight:

Formula I

| | |
|---|---|
| Carbon black | .50 |
| Silica | 3.00 |
| Titanium dioxide | 5.00 |
| Zinc chromate | 2.00 |
| Polychlordiphenyl dist. range (332°–381° C.) | 8.00 |
| Chlorinated rubber (125 centipoise) | 16.00 |
| Phenolic resin | 4.00 |
| Xylol | 61.50 |

The phenolic resin in the above formula may be replaced by a similar proportion of long oil alkyd resin and the mineral pigments in the primer may be varied within reasonable limits, so long as a sufficient amount of corrosion inhibiting pigment is retained. We prefer to keep the silica content of the primer relatively low and to employ mineral pigments which have a small particle size as compared with the thickness of the film.

A variety of suitable primers are available commercially. Thus, "Amercoat" primer 3B (low silica) for wood and metal, or "Heresite" primer VR—504 may be used. These primers (which are of the general type of Formula I, and comprise pigment plus chlorinated rubber and a resin)

have good caustic resistance as compared to ordinary primers for metal surfaces but are much less resistant to attack by caustic soda than is the polystyrene film which is employed over them. Generally speaking, one coat of primer is sufficient.

A suitable composition for obtaining a protective polystyrene film, in accordance with our invention, has the following formula:

*Formula II*

| | Parts by weight |
|---|---|
| Polystyrene m. w. 200,000 | 12.00 |
| Carbon black | 3.60 |
| Diamyl naphthalene | 2.40 |
| Xylol | 64.00 |
| High flash naphtha | 18.00 |

As indicated above, the molecular weight of the polystyrene may be varied depending upon the maximum service temperature, polystyrene of about 50,000 molecular weight being preferred for relatively low temperature conditions while polystyrene of a molecular weight of about 100,000 to about 200,000 is preferred when the film must withstand the action of caustic at temperatures in excess of 200° F.

Titanium dioxide or other caustic-inert pigment may be employed instead of the carbon black, although carbon black gives a film which has a higher resistance to caustic at high temperatures and is much to be preferred to other caustic-resistant pigments. Commercial carbon black of the type available for use in lacquers and other coating compositions has been found to be satisfactory when properly ground with polystyrene. If the carbon black has been insufficiently ground so that it is not adequately dispersed in the polystyrene, the film tends to "crater" upon exposure to strong hot caustic solutions, perhaps due to the fact that improper carbon dispersion is accompanied by the inclusion of air in the composition.

A number of caustic-resistant plasticizers may be employed, although diamyl naphthalene and chlorinated diphenyls are preferred. A chlorinated diphenyl known as "Arochlor" 1262 of distillation range 313° C. to 404° C. is recommended.

It is not essential to employ a plasticizer in the polystyrene film used in accordance with our invention, and it may be eliminated entirely, although at the expense of a somewhat brittle but nevertheless durable and useable film.

The ratio of polystyrene to finely-divided solid to employ will depend upon several factors including the molecular weight of the polystyrene, the fineness of the solid, and the degree of plasticity desired in the final film. Generally speaking, however, the proportions of polystyrene should be about 3 to 4 times that of the finely-divided solid, say, carbon black. The proportion of plasticizer, if any, which is employed is not critical, but should be as low as possible, consistent with required plasticity of the film. The proportions of solvent to employ depend upon the viscosity desired in the material for application. Good results are obtained with a composition for brush application in which the solvent is about 4 to 5 times the weight of the film-forming ingredients.

The xylol and high flash naphtha included in the foregoing composition are solvents or diluents for the film-forming ingredients of the composition. A variety of other solvents for polystyrene may, of course, be employed because they evaporate and are not found in substantial quantity in the final film. The proportions of solvents to employ will depend upon the viscosity and flow characteristics desired in the composition. The particular proportions employed in the foregoing formula are particularly suitable when the composition is to be applied by brushing.

The polystyrene coating composition described above (Formula II) will spread readily to cover about 200–300 square feet per gallon. Preferably, the coating composition is applied by brushing. With ordinary spray technique at relatively low temperatures the composition tends to "cobweb," although such effects may be overcome by high spraying temperatures or by other means.

A polystyrene film thickness of .002 inch to .005 inch is desirable. Film of such thickness can be obtained by brush application of the previously described composition (Formula II) with from five to eight coats.

To cite a specific example of the practice of our invention in the coating of a tank car, the steel surface of the car was prepared by removal of all rust and foreign matter by shot blasting with small shot. The resultant surface was clean and relatively smooth.

To the cleaned surface, one coat of the primer described hereinbefore was applied by brushing and this coating was allowed to dry overnight, the interior of the tank car being ventilated during the drying period. To the dry primed surface, a plurality of coats of the hereinbefore described polystyrene coating composition were brushed, employing one gallon of the composition for each 275 square feet of surface coated. After each coat was applied, it was dried overnight by ventilating with air at temperatures at 140°–160° F. The tank car, after receiving its eight coats of polystyrene coating composition, was immediately ready for use and could be subjected to strong caustic solutions at temperatures at 230°–240° F. with an expectation of a life of two to four years.

The polystyrene coatings used in accordance with our invention afford numerous advantages as compared with compositions heretofore available for preventing interaction between strong caustic solutions and the metal of containers in which these are stored. They may be subjected to drastic temperature changes without fear of rupture. Thus, exposure of the coatings to caustic soda solutions at high temperatures may be followed by cooling and washing with hot or cold water (as in washing out a tank car) without separation of the coating from the primer or metal and without apparent deleterious effect upon the life of the coating.

The resistance of the coatings to the action of caustic at elevated temperatures is sufficiently good that very strong caustic, say, 70% or better, may be kept in contact with the lining for long periods of time at temperatures above that at which the solutions tend to solidify. Hence, in tank cars lined with a polystyrene film in accordance with our invention, shipments of strong caustic can be made at temperatures high enough to insure that the contents of the car will arrive at its destination in a liquid condition. This is a considerable advantage in that it permits shipment in tank cars which are not equipped with the customary heating coils or pipes needed to melt the caustic prior to discharge. Such coils, at best, are difficult to protect from corrosion, and their presence in a tank car makes difficult the painting of other portions of the interior. Hence, their elimination is desirable. A further advantage accruing to the ability to ship strong caustic in liquid state in cars lined with our polystyrene film resides in the fact that at the destination unloading is more rapid, since it is unnecessary to heat the solution prior to discharge.

The coatings used in accordance with our invention, unlike many prior coatings, manifest no tendency to separate or peel from either steel or primer if a break in the coating does occur. Indeed, the coating is destroyed by spreading from a break to the extent of only about ⅜ inch at 285° F. in 70% NaOH solution in twenty days.

The coatings used in accordance with our invention are such that breaks in them, if these occur, may be repaired simply by cleaning and repainting the portion exposed by the break.

The desirability of a coating applied in accordance with our invention under very severe conditions of exposure is illustrated by the fact that a coating formulated according to Formula II and applied to a steel panel over a coating of the primer of Formula I was substantially unaffected and showed no signs of breakdown after exposure in 70% caustic soda solution at 230° F. for forty-three days. The panel was further subjected to five days exposure to the caustic solution at 257° F. and then to six days exposure at 285° F. before breakdown (due to pinholing) was great enough to render the coating useless from the standpoint of protecting the caustic from contamination. In contrast, an identical panel protected with an ethyl cellulose coating composition showed blistering and peeling after 25 days in 70% caustic soda solution at 230° F.; an identical panel coated with a chlorinated rubber composition failed by cracking, blistering and peeling in eight days in 70% caustic at 230° F.; and a panel coated with a polyvinyl chloracetate film failed by blistering under the same conditions in sixteen days.

We claim:

1. A method of preserving caustic soda in metallic containers from contamination with corrosion products of the metals of the containers which comprises applying to the metal surface a priming coat having good adherence for the metal and for a mixture containing a relatively large proportion of polystyrene and a relatively smaller proportion of a finely-divided pigment that is substantially inert with respect to caustic, the priming coat containing substantial proportions of chlorinated rubber and of resins selected from the group consisting of phenolic resins and long oil alkyd resins, and subsequently applying to the primed surface a coating of the said mixture.

2. A method of preserving caustic soda in metallic containers from contamination with corrosion products of the metals of the containers which comprises applying to the metal surface a priming coat having good adherence for the metal, said priming coat having the formula

| | Approximate parts by weight |
|---|---|
| Carbon black | .50 |
| Silica | 3.00 |
| Titanium dioxide | 5.00 |
| Zinc chromate | 2.00 |
| Polychlordiphenyl, dist. range (332°–381° C.) | 8.00 |
| Chlorinated rubber (125 centipoise) | 16.00 |
| Phenolic resin | 4.00 |
| Xylol | 61.50 | and thereafter applying to the primed surface a mixture containing a relatively large proportion of polystyrene and a relatively smaller proportion of a finely-divided pigment that is substantially inert with respect to caustic.

3. The method of preserving caustic soda in metallic containers from contamination with corrosion products of the metals of the containers which comprises applying to the metal surface a priming coat having good adherence for the metal and comprising corrosion inhibiting pigments mixed with chlorinated rubber and a compound selected from the group consisting of phenolic resins and long oil alkyd resins, and subsequently applying to the primed surface a mixture containing a relatively large proportion of polystyrene and a relatively smaller proportion of a finely-divided pigment that is substantially inert with respect to caustic.

4. A method of preserving caustic soda in metallic containers from contamination with corrosion products of the metals of the containers which comprises applying to the metal surface a priming coat containing chlorinated rubber and a resin selected from the group consisting of phenolic resins and long oil alkyd resins having good adherence for the metal and for a mixture containing a relatively large proportion of polystyrene and a relatively small proportion of a finely-divided pigment and a relatively small proportion of a plasticizer, both pigment and plasticizer being substantially inert with respect to caustic soda, and subsequently applying to the primed surface a coating of said mixture.

JOHN LYMAN SWITZER.
JOHN C. MICHALEK.

REFERENCES CITED

The following references are of record in the file of this patent:

UNITED STATES PATENTS

| Number | Name | Date |
|---|---|---|
| 1,529,056 | Ellis | Mar. 10, 1925 |
| 1,613,674 | Ostromislensky | June 11, 1927 |
| 1,912,371 | Jacobson et al. | June 6, 1933 |
| 1,965,627 | Bogin | July 10, 1934 |
| 2,088,140 | Rosenthal | July 27, 1937 |
| 2,105,567 | Webb | Jan. 18, 1938 |
| 2,111,342 | Waldeck | Mar. 15, 1938 |
| 2,158,281 | Ford | May 16, 1939 |
| 2,166,557 | Stoesser et al. | July 18, 1939 |
| 2,198,939 | Hempel | Apr. 30, 1940 |
| 2,211,689 | Dittmar | Aug. 13, 1940 |
| 2,229,616 | Wampner | Jan. 21, 1941 |
| 2,273,822 | Allen | Feb. 24, 1942 |

FOREIGN PATENTS

| Number | Country | Date |
|---|---|---|
| 16,277 | Great Britain | 1911 |
| 402,877 | Great Britain | Dec. 14, 1933 |

OTHER REFERENCES

British Plastics, vol. 4, page 134 (1932).